(12) United States Patent
Hampson et al.

(10) Patent No.: US 11,945,883 B2
(45) Date of Patent: Apr. 2, 2024

(54) BINDER COMPOSITIONS AND USES THEREOF

(71) Applicant: KNAUF INSULATION SPRL, Visé (BE)

(72) Inventors: Carl Hampson, St. Helens (GB); Ferdous Khan, St. Helens (GB)

(*) Notice: Subject to any disclaimer, the term of this patent is extended or adjusted under 35 U.S.C. 154(b) by 0 days.

(21) Appl. No.: 17/721,298

(22) Filed: Apr. 14, 2022

(65) Prior Publication Data

US 2022/0306769 A1 Sep. 29, 2022

Related U.S. Application Data

(63) Continuation of application No. 15/772,054, filed as application No. PCT/EP2016/075825 on Oct. 26, 2016, now Pat. No. 11,325,985.

(30) Foreign Application Priority Data

Oct. 30, 2015 (GB) ...................... 1519188

(51) Int. Cl.
| | | |
|---|---|---|
| *C08B 31/00* | (2006.01) | |
| *B27N 3/00* | (2006.01) | |
| *C08J 3/28* | (2006.01) | |
| *C08J 5/04* | (2006.01) | |
| *C08K 3/20* | (2006.01) | |
| *C08K 3/30* | (2006.01) | |
| *C08K 5/23* | (2006.01) | |

(Continued)

(52) U.S. Cl.
CPC ............ *C08B 31/003* (2013.01); *B27N 3/002* (2013.01); *C08J 3/28* (2013.01); *C08J 5/04* (2013.01); *C08J 5/045* (2013.01); *C08K 3/20* (2013.01); *C08K 3/30* (2013.01); *C08K 5/235* (2013.01); *C08L 3/04* (2013.01); *C08L 33/00* (2013.01); *C08L 33/02* (2013.01); *C08L 33/08* (2013.01); *C08L 33/26* (2013.01); *C09J 4/06* (2013.01); *C08J 2303/02* (2013.01); *C08K 2003/3045* (2013.01)

(58) Field of Classification Search
None
See application file for complete search history.

(56) References Cited

U.S. PATENT DOCUMENTS

| | | |
|---|---|---|
| 5,026,746 A | 6/1991 | Floyd et al. |
| 2009/0170978 A1 | 7/2009 | Kelly |

(Continued)

FOREIGN PATENT DOCUMENTS

| | | |
|---|---|---|
| EP | 0354023 | 2/1990 |
| EP | 2924071 | 9/2015 |
| WO | 2012136605 | 10/2012 |

OTHER PUBLICATIONS

Office action for co-pending U.S. Appl. No. 15/772,054 (17 pages)—dated Feb. 10, 2020.

(Continued)

*Primary Examiner* — Stefanie J Cohen
(74) *Attorney, Agent, or Firm* — Knauf Insulation, Inc.; James K. Blodgett (57) ABSTRACT

The present invention relates to new aqueous curable binder compositions comprising a carbohydrate compound, a first cross linker and a second cross linker different from the first capable of undergoing radical polymerization and possibly a free radical initiator.

13 Claims, 1 Drawing Sheet

(51) Int. Cl.
*C08L 3/04*    (2006.01)
*C08L 33/00*   (2006.01)
*C08L 33/02*   (2006.01)
*C08L 33/08*   (2006.01)
*C08L 33/26*   (2006.01)
*C09J 4/06*    (2006.01)

(56) References Cited

U.S. PATENT DOCUMENTS

| | | | |
|---|---|---|---|
| 2010/0143738 A1* | 6/2010 | Bloembergen | B29C 48/57 524/498 |
| 2010/0330376 A1 | 12/2010 | Trksak et al. | |
| 2011/0086567 A1 | 4/2011 | Hawkins et al. | |
| 2011/0189479 A1 | 8/2011 | Zhang et al. | |
| 2011/0223364 A1 | 9/2011 | Hawkins et al. | |
| 2013/0005870 A1* | 1/2013 | Kelly | C08L 3/02 524/48 |
| 2015/0053114 A1 | 2/2015 | Hampson et al. | |

OTHER PUBLICATIONS

Office action for co-pending U.S. Appl. No. 15/772,054 (15 pages)—dated Jul. 29, 2020.
Ofice action for co-pending U.S. Appl. No. 15/772,054 (16 pages)—dated Dec. 15, 2020.
Office action for co-pending U.S. Appl. No. 15/772,054 (18 pages)—dated May 3, 2021.

* cited by examiner

BINDER COMPOSITIONS AND USES THEREOF

CROSS-REFERENCE TO RELATED APPLICATIONS

This application is a continuation of U.S. application Ser. No. 15/772,054, filed Apr. 28, 2018, which is a U.S. national counterpart application of International Application Serial No. PCT/EP2016/075825, filed Oct. 26, 2016, under 35 U.S.C. § 371, which claims priority to GB Application Serial No. 1519188.5, filed Oct. 30, 2015, the disclosures of which are hereby incorporated herein by reference.

TECHNICAL FIELD

The present invention relates to new improved binder compositions, more specifically curable binder compositions for use in manufacturing products from a collection of non or loosely assembled matter. For example, these binder compositions may be employed to fabricate fiber products which may be made from woven or nonwoven fibers. In one illustrative embodiment, the binder compositions are used to bind glass fibers to make fiberglass. In another illustrative embodiment, the binder compositions are used to bind mineral wool fibers, such as glass wool or stone wool in a matted layer, such as an insulating product. In a further embodiment, the binders are used to fabricate, for example, wood fiber board, particle board or oriented strand board (OSB), which has desirable physical properties (e.g., mechanical strength). Further, the binders may be used to assemble sheets of cellulosic material, such as sheets of wood to manufacture plywood. The invention further extends to a process for using said binder compositions to bound loosely assembled matter, and to a product made from loosely assembled matter bound by a binder of the invention.

BACKGROUND

Several formaldehyde-free binder compositions have been developed in recent times. One such curable binder composition involves sustainable materials and is based on polyester chemistry, more particularly curable aqueous binder compositions comprising a polyacid component or anhydride or salt derivatives thereof, and a polyhydroxy component, possibly together with a silicon containing compound. Another such composition involves the condensation of ammonium salt of inorganic acids or of polycarboxylic acids or an amine, preferably a polyamine, with reducing sugars as thermosets. These chemistries show advantages as compared to prior formaldehyde based technology, but lead to cured resins that show a coloration which may not be desirable in certain applications. Thus, there still is a need for improved binder chemistry. There further is an ongoing interest in improving the bond strength of the employed binder compositions, hence providing improved final products, showing improved properties, and/or final products with reduced binder content, at more advantageous costs.

OBJECTS OF THE INVENTION

The present invention seeks to provide binder compositions which upon curing generate or promote cohesion and are capable of holding together a collection of loosely assembled matter, such as fibres or cellulosic particles or sheet material such that the matter adheres in a manner to resist separation. An objective of the present invention is to provide binders showing acceptable bond strength.

More particularly in the case of insulation products based on mineral wool, the binder is required to hold the fibers together, but also needs to show sufficient elasticity to allow for compression of the wool, e.g. for transport and/or storing purposes, and after withdrawal of the compression for the insulation product to retrieve its initial shape.

Another objective of the present invention is to provide cost-effective binder compositions for large volume applications.

Another objective is to provide a binder composition based on renewable and/or sustainable resources.

Further, the invention seeks to provide binder compositions that rapidly cure into strong binders.

Yet another purpose of the invention is to provide an assembly of matter bonded with the invention binder.

SUMMARY

The present invention now provides an aqueous curable binder composition comprising a carbohydrate compound, a first cross linker and a second cross linker, the second cross linker being different from the first cross linker and being capable of undergoing radical polymerization, and possibly a free radical initiator. The said binder composition may already comprise some reaction product resulting from the cross-linking between carbohydrate compound and cross linkers.

DETAILED DESCRIPTION

Curing is understood to mean that the relevant composition is subjected to conditions that lead to chemical change, such as covalent bonding, hydrogen bonding and chemical crosslinking, which may increase the cured product's durability and solvent resistance, and result in thermoset material.

According to a first embodiment, the carbohydrate compound is selected from monosaccharide and/or polysaccharide.

The monosaccharide may be any saccharide unit known in the art. Most common saccharide units comprise 5 or 6 carbon atoms. They may be reducing sugars (in the aldose or ketose form) or not. The term saccharide is understood to include sugar derivatives, such as sugar alcohols.

The polysaccharide may comprise at least two, preferably at least 4 saccharide units and up to $10^6$ saccharide units, preferably up to 10000 saccharide units, more preferably up to 5000 or even 3000 saccharide units. It may be selected from native starch and starch derivatives. Starch comprises two different polymers of D-glucopyranose, amylose and amylopectin. Amylose is a linear polysaccharide, while amylopectin is a highly branched polysaccharide. Amylose has a relatively low molecular weight with a degree of polymerisation ranging from 1000 to 10000 glucose units and a $M_w>10^6$ g/mol, whereas amylopectin is a larger branched polysaccharide with a degree of polymerisation beyond $10^5$ and a $M_w>10^7$ g/mol. Starch derivatives include but are not limited to starch ethers such as carboxymethyl starches, hydroxyalkyl starches, cationic starches, amphoteric starches, starch esters such as starch acetates, starch phosphates, starch octenyl succinate and the starch copolymers, or any other partially hydrolysed starch, acid modified starch, oxide modified starch and partially hydrolysed starch, including but not limited to dextrin. Polysaccharides may also be derived from cellulose or other natural or synthetic sources, like chitin for instance.

The polysaccharides also include sugar derivatives, such as derivatives obtained by hydrogenation, more specifically sugar derived polyols or polyhydric alcohols, for example maltitol.

The first cross linker may be a carboxyl function bearing compound which forms esters with the carbohydrate compound. Preferably, the carboxyl function bearing compound comprises more than one, preferably two or three, carboxyl functions.

Suitable functional compounds are selected from polycarboxylic acids, such as dicarboxylic acids and tricarboxylic acids, advantageously monomeric and polymeric polycarboxylic acids. Illustratively, a monomeric polycarboxylic acid may be a dicarboxylic acid or tricarboxylic acid, including, but not limited to, unsaturated aliphatic polycarboxylic acids, saturated aliphatic polycarboxylic acids, aromatic polycarboxylic acids, unsaturated cyclic polycarboxylic acids, saturated cyclic polycarboxylic acids, optionally substituted, such as with hydroxy, halo, amino, alkyl, carboxy, alkoxy, anhydrides, salt, esters and mixtures thereof. Advantageously, the monomeric polycarboxylic acid is selected from malic acid, glutamic acid, glutaconic acid, 3-fumarylpyruvic acid, 2,5-furandicarboxylic acid, mesaconic acid, mesoxalic acid, glutaric acid, nedocromil, 4-(gamma-glutamylamino)butanoic acid, neoglutyl, succinic acid and citric acid. Suitable polymeric carboxylic acids are exemplified herein.

The cross linker capable of undergoing radical polymerization may be selected from polycarboxylic acid, acrylamides and methacrylamides, acrylates, acrylic acids and their salts, acrylonitrile, bisphenol acrylics, carbohydrate monomers, fluorinated acrylics, maleimide, polyfunctional acrylics, and mixtures thereof. In the event free radical polymerization is to be initiated by free radical initiator, the composition may further comprise one or more free radical initiator for initiation of the cross-linking reactions between saccharide residues and the cross-linker. Such reaction mechanisms are well known in the art. The reaction may be initiated by provision of energy, including heat and/or appropriate radiation. Upon curing, such binder composition produces a highly cross-linked binder resin which confers improved bond strength to the assembly of matter in accordance with the invention.

The binder compositions of the invention appear particularly suitable for bonding fibers and cellulosic particulate or sheet materials, as the curing liberates few or no water, hence reducing the energy required for evaporation of water contained in the final product.

Suitable polycarboxylic acids capable of undergoing radical polymerization may advantageously be selected from monomeric and polymeric polycarboxylic acids. Illustratively, a monomeric polycarboxylic acid may be a dicarboxylic or tricarboxylic acid, including, but not limited to, unsaturated aliphatic polycarboxylic acids, saturated aliphatic polycarboxylic acids, aromatic polycarboxylic acids, unsaturated cyclic polycarboxylic acids, saturated cyclic polycarboxylic acids, optionally substituted, such as with hydroxy, halo, amino, alkyl, carboxy, alkoxy, anhydrides, salt, esters and mixtures thereof. Advantageously, the monomeric polycarboxylic acid is selected from malic acid, glutamic acid, glutaconic acid, 3-fumarylpyruvic acid, 2,5-furandicarboxylic acid, mesaconic acid, mesoxalic acid, glutaric acid, nedocromil, 4-(gamma-glutamylamino)butanoic acid, neoglutyl, succinic acid and citric acid. Other suitable polycarboxylic acids are contemplated to include, but are not limited to, aconitic acid, adipic acid, azelaic acid, butane tetracarboxylic acid dihydride, butane tricarboxylic acid, chlorendic acid, citraconic acid, dicyclopentadiene-maleic acid adducts, diethylenetriamine pentaacetic acid, adducts of dipentene and maleic acid, ethylenediamine tetraacetic acid (EDTA), fully maleated rosin, maleated tall-oil fatty acids, fumaric acid, glutaric acid, isophthalic acid, itaconic acid, maleated rosin oxidized with potassium peroxide to alcohol then carboxylic acid, maleic acid, malic acid, mesaconic acid, biphenol A or bisphenol F reacted via the KOLBE-Schmidt reaction with carbon dioxide to introduce 3-4 carboxyl groups, oxalic acid, phthalic acid, sebacic acid, succinic acid, tartaric acid, terephthalic acid, tetrabromophthalic acid, tetrachlorophthalic acid, tetrahydrophthalic acid, trimellitic acid, trimesic acid, and the like, and anhydrides, and combinations thereof. Illustratively, a polymeric polycarboxylic acid may be an acid, for example, polyacrylic acid, polymethacrylic acid, polymaleic acid, and like polymeric polycarboxylic acids, copolymers thereof, anhydrides thereof, and mixtures thereof. Examples of commercially available polyacrylic acids include AQUASET-529 (Rohm & Haas, Philadelphia, PA, USA), CRITERION 2000 (Kemira, Helsinki, Finland, Europe), NF1 (H. B. Fuller, St. Paul, MN, USA), and SOKALAN (BASF, Ludwigshafen, Germany, Europe). With respect to SOKALAN, this is a water-soluble polyacrylic copolymer of acrylic acid and maleic acid, having a molecular weight of approximately 4000. AQUASET-529 is a composition containing polyacrylic acid cross-linked with glycerol, also containing sodium hypophosphite as a catalyst. CRITERION 2000 is an acidic solution of a partial salt of polyacrylic acid, having a molecular weight of approximately 2000. With respect to NF1, this is a copolymer containing carboxylic acid functionality and hydroxy functionality, as well as units with neither functionality; NF1 also contains chain transfer agents, such as sodium hypophosphite or organophosphate catalysts.

As described in U.S. Pat. Nos. 5,318,990 and 6,331,350, the polymeric polycarboxylic acid comprises an organic polymer or oligomer containing more than one pendant carboxy group. The polymeric polycarboxylic acid may be a homopolymer or copolymer prepared from unsaturated carboxylic acids including, but not necessarily limited to, acrylic acid, methacrylic acid, crotonic acid, isocrotonic acid, maleic acid, cinnamic acid, 2-methylmaleic acid, itaconic acid, 2-methylitaconic acid, α,β-methyleneglutaric acid, and the like. Alternatively, the polymeric polycarboxylic acid may be prepared from unsaturated anhydrides including, but not necessarily limited to, maleic anhydride, itaconic anhydride, acrylic anhydride, methacrylic anhydride, and the like, as well as mixtures thereof. Methods for polymerizing these acids and anhydrides are well-known in the chemical art. The polymeric polycarboxylic acid may additionally comprise a copolymer of one or more of the aforementioned unsaturated carboxylic acids or anhydrides and one or more vinyl compounds including, but not necessarily limited to, styrene, α-methylstyrene, acrylonitrile, methacrylonitrile, methyl acrylate, ethyl acrylate, n-butyl acrylate, isobutyl acrylate, methyl methacrylate, n-butyl methacrylate, isobutyl methacrylate, glycidyl methacrylate, vinyl methyl ether, vinyl acetate, and the like. Methods for preparing these copolymers are well-known in the art. The polymeric polycarboxylic acids may comprise homopolymers and copolymers of polyacrylic acid. The molecular weight of the polymeric polycarboxylic acid, and in particular polyacrylic acid polymer, may be is less than 10000 Dalton (Da), less than 5000 Da, or about 3000 Da or less. For example, the molecular weight may be 2000 Da.

Suitable examples of acrylamide and methacrylamide monomers include alkylacrylamide, N-tert-Butylacrylamide, Diacetone acrylamide, N,N-Diethylacrylamide, N,N-Diethylmethacrylamide, N,N-Dimethylacrylamide, N-[3-(Dimethylamino)propyl]methacrylamide, N-Diphenylmethylacryl-amide, N-Ethylacrylamide, N,N'-Hexamethylenebis(methacrylamide), N-Hydroxyethyl acrylamide, N-(Hydroxymethyl)acrylamide, N-(2-Hydroxypropyl)-2-methyl-prop-2-enamide, N-(Isobutoxymethyl)-acrylamide, N-Isopropylacrylamide, N-Isopropylmethacrylamide, Methacrylamide, N-(3-Methoxypropyl)acrylamide, N-Phenylacrylamide, 2-Acrylamido-2-methyl-1-propanesulfonic acid and its salts, 3-(Acrylamido)phenylboronic acid, N-Acryloylamidoethoxyethanol, N-(Triphenylmethyl)-methacrylamide and N-[Tris(hydroxymethyl)methyl]-acrylamide.

Examples of suitable acrylate monomers include 4-Acetoxyphenethyl acrylate, 4-Acryloylmorpholine, Butyl acrylate, 2-(4-Benzoyl-3-hydroxyphenoxy)ethyl acrylate, Benzyl 2-propylacrylate, tert-Butyl acrylate, 2-[[(Butylamino)carbonyl]oxy]ethyl acrylate, 4-tert-Butylcyclohexyl acrylate, 2-Carboxyethyl acrylate, 2-(Diethylamino)ethyl acrylate, Di(ethylene glycol) ethyl ether acrylate, Di(ethylene glycol) 2-ethylhexyl ether acrylate, 2-(Dimethylamino) ethyl acrylate, 3-(Dimethylamino)propyl acrylate, Dipentaerythritol penta-/hexa-acrylate, Ethyl acrylate, Ethyl cis-(β-cyano)acrylate, Ethylene glycol dicyclopentenyl ether acrylate, Ethylene glycol methyl ether acrylate, Ethylene glycol phenyl ether acrylate, Ethyl 2-ethylacrylate, 2-Ethylhexyl acrylate, Ethyl 2-propylacrylate, Ethyl 2-(trimethylsilylmethyl)acrylate, Hexyl acrylate, 4-Hydroxybutyl acrylate, 2-Hydroxyethyl acrylate, 2-Hydroxy-3-phenoxypropyl acrylate, Hydroxypropyl acrylate, Isobutyl acrylate, Isodecyl acrylate, Isooctyl acrylate, Lauryl acrylate, Methyl 2-acetamidoacrylate, Methyl acrylate, Methyl 3-hydroxy-2-methylenebutyrate, Octadecyl acrylate, Poly(ethylene glycol) acrylate, Poly(ethylene glycol) diacrylate, Poly(ethylene glycol) methyl ether acrylate, Poly(propylene glycol) acrylate, 3-Sulfopropyl acrylate and salts, Tetrahydrofurfuryl acrylate, 2-Tetrahydropyranyl acrylate, 3-(Trimethoxysilyl)propyl acrylate, 3,5,5-Trimethylhexyl acrylate, 10-Undecenyl acrylate, and Urethane acrylate methacrylate.

Preferred methacrylate monomers may be selected from Allyl methacrylate, Aminoethyl methacrylate, 2-[3-(2H-Benzotriazol-2-yl)-4-hydroxyphenyl]ethyl methacrylate, Benzyl methacrylate, Bis(2-methacryloyl)oxyethyl disulphide, Bis(2-methacryloyl)oxyethyl disulphide, 2-(2-Bromoisobutyryloxy)ethyl methacrylate, 2-(tert-Butylamino) ethyl methacrylate, Butyl methacrylate, tert-Butyl methacrylate, Carbazole-9-ethylmethacrylate, 3-Chloro-2-hydroxypropyl methacrylate, Cyclohexyl methacrylate, 2-(Diethylamino)ethyl methacrylate, Diethylene glycol butyl ether methacrylate, Di(ethylene glycol) methyl ether methacrylate, 2-(Diisopropylamino)ethyl methacrylate, 2-(Dimethylamino)ethyl methacrylate, 2-Ethoxyethyl methacrylate, Ethylene glycol dicyclopentenyl ether methacrylate, Ethylene glycol methacrylate phosphate, Ethylene glycol methyl ether methacrylate, Ethylene glycol phenyl ether methacrylate, Ethylhexyl methacrylate, Ethyl methacrylate, Furfuryl methacrylate, Glycidyl methacrylate, Glycosyloxyethyl methacrylate, Hexyl methacrylate, Hydroxybutyl methacrylate, Hydroxyethyl methacrylate, Hydroxypropyl methacrylate, hydroxypropyl methacrylates, 2-Hydroxypropyl 2-(methacryloyloxy)ethyl phthalate, 2-Hydroxy-3-{3-[2,4,6,8-tetramethyl-4,6,8-tris(propyl glycidyl ether)-2-cyclotetrasiloxanyl]propoxy}propyl meth acrylate, Isobutyl methacrylate, 2-Isocyanatoethyl methacrylate, Isodecyl methacrylate, Lauryl methacrylate, Methacrylic acid N-hydroxysuccinimide ester, Methyl methacrylate, 2-(M ethylthio)ethyl methacrylate, mono-2-(Methacryloyloxy)ethyl maleate, mono-2-(Methacryloyloxy)ethyl succinate, 2-N-Morpholinoethyl methacrylate, Naphthyl methacrylate, 2-(2-Oxo-1-imidazolidinyl)ethyl methacrylate, Pentabromophenyl methacrylate, 1,4-Phenylene dimethacrylate, Phenyl methacrylate, Phosphoric acid 2-hydroxyethyl methacrylate ester, Poly(ethylene glycol) behenyl ether methacrylate, Poly(propylene glycol) methacrylate, Propyl methacrylate, 1-Pyrenemethyl methacrylate, Stearyl methacrylate, 3-Sulfopropyl methacrylate and salts, 3-(Trimethoxysilyl)propyl methacrylate, 3,3,5-Trimethylcyclohexyl methacrylate, (Trimethylsilyl)methacrylate, Urethane acrylate methacrylate, Urethane epoxy methacrylate and Vinyl methacrylate.

In principle polyfunctional acrylics are used as second cross linker, and most preferable polyfunctional acrylic compounds are selected from 3-(Acryloyloxy)-2-hydroxypropyl methacrylate, Bis[2-(methacryloyloxy)ethyl] phosphate, Bisphenol A propoxylate diacrylate, 1, 3- or 4-Butanediol diacrylate, 1,3 or 4-Butanediol dimethacrylate, N,N'-(1,2-Dihydroxyethylene)bisacrylamide, Di(ethylene glycol)dimethacrylate, Di(trimethylolpropane) tetraacrylate, Diurethane dimethacrylate, N,N'-Ethylenebis(acrylamide), Ethylene glycol dimethacrylate, Glycerol 1,3-diglycerolate diacrylate, Glycerol dimethacrylate, Glycerol propoxylate triacrylate, 1,6-Hexanediol diacrylate, 1,6-Hexanediol dimethacrylate, 1,6-Hexanediol ethoxylate diacrylate, 1,6-Hexanediylbis[oxy(2-hydroxy-3,1-propanediyl)] bisacrylate, Hydroxypivalyl hydroxypivalate bis[6-(acryloyloxy) hexanoate], Neopentyl glycol diacrylate, Neopentyl glycol propoxylate diacrylate, Pentaerythritol diacrylate monostearate, Pentaerythritol tetraacrylate, Pentaerythritol triacrylate, Poly(propylene glycol) diacrylate, Poly(propylene glycol) dimethacrylate, 1,3,5-Triacryloylhexahydro-1,3,5-triazine, Tricyclo-decanedimethanol diacrylate, Trimethylolpropane ethoxylate methyl ether diacrylate, Trimethylolpropane ethoxylate triacrylate, Trimethylolpropane ethoxylate triacrylate, Trimethylolpropane ethoxylate triacrylate, Trimethylolpropane propoxylate triacrylate, Trimethylolpropane triacrylate, Trimethylolpropane trimethacrylate, Tri(propylene glycol) diacrylate and Tris[2-(acryloyloxy)ethyl] isocyanurate.

The weight fraction on a dry basis of total cross linker in the binder composition may advantageously vary from 2-30 w %, preferably from 5-20 w %, more preferably from 5-15 w %. The weight ratio of first to second cross linker may vary from 10:1 to 1:10, preferably from 5:1 to 1:1.

The free radical initiators may include inorganic peroxides, organic peroxides, azo compounds, redox initiators and/or their mixtures thereof.

Inorganic peroxides may be selected from hydrogen peroxide or peroxodisulfates such as the mono- or di-alkali metal or ammonium salts of peroxodisulfuric acid such as their mono- and di-sodium, ammonium salts. Preferred inorganic peroxides are ammonium, or sodium or potassium persulfates or mixtures thereof.

Organic peroxides may be selected from alkyl hydroperoxides, for example tert-butyl hydroperoxide, cumyl hydroperoxide, cumene hydroperoxide, and dialkyl or diaryl such as di-tert-butyl or dicumyl peroxide, di-tert-amyl peroxide are used. Other organic peroxides such as benzyl peroxide, butanone peroxide, lauroyl peroxide, 2,5-Bis(tert-butylperoxy)-2,5-dimethylhexane, 1,1-Bis(tert-butylperoxy)-3,3,5-trimethyl-cyclohexane, 1,1-Bis(tert-amylperoxy)cyclohexane, tert-Butyl peroxybenzene, and tert-Butyl peroxy 2-ethylhexyl carbonate.

Preferred azo compounds generally are azobis (isobutyronitrile) (AIBN), 2,2'-Azobis(2-methylpropionitrile), 4,4'-azobis(4-cyanovaleric acid), 1,1'-azobis(cyclohexanecarbonitrile), 2,2-azobis(2,4-dimethylvaleronitrile) and 2,2'-azobis(amidinopropyl) dihydrochloride (AIBA).

Suitable oxidizing agents for redox initiators are selected from the abovementioned peroxides. Suitable reducing agents may be selected from sulfur compounds with a low oxidation state, such as alkali metal sulfites, for example potassium and/or sodium sulfite, alkali metal such as potassium and/or sodium hydrogen sulfite, alkali metal such as potassium and/or sodium metabisulfite, for example, potassium and/or sodium, alkali metal salts, especially potassium and/or sodium salts of aliphatic sulfinic and alkali metal hydrogen sulfides, such as potassium and/or sodium hydrogen sulfide, salts of polyvalent metals, such as iron(II) salts and Cerium (IV) salts, for example iron(II) ammonium sulfate, iron (II) phosphate, and ceric ammonium nitrate.

The weight ratio on a dry basis of cross linker capable of undergoing free radical polymerization and free radical initiator for initiation of cross-linking reactions between saccharide residues and the cross linker may vary between 2/0.5 and 20/1, preferably 5/1 to 10/1. The aforementioned initiators generally represent from 0.05 to 5 wt. %, preferably <2 wt. % and most preferably <1 wt. % of the total weight of the composition on a dry weight basis.

Starch is a natural biodegradable biopolymer derived from a variety of plant sources, such as maize, corn, wheat, oats, barley, rice, millet, potatoes, peas, tapioca, sorghum and sago. The starch contains amylose and amylopectin and the ratio of these components may be varied by varying the type of plant breeding.

Moreover, the invention binder composition shows less tendency to form dark brown colour binder resins (e.g. Champagne, Tapioca, Vanilla custard, *Papyrus*, Nude, Wheat, etc.) as is typical for carbohydrate based binder chemistry.

The binder compositions of the invention and binders produced therefrom are essentially formaldehyde-free (that is comprising less than about 1 ppm formaldehyde based on the weight of the composition) and do not liberate substantial formaldehyde.

Upon curing, the invention binder composition produces a highly cross-linked resin which shows a high polymerization density and which confers high bond strength to the assembly of matter in accordance with the invention.

The invention compositions may obviously further comprise coupling agents, dyes, antifungal agents, antibacterial agents, hydrophobes and other additives known in the art for such binder applications, as may be appropriate. Silicon-containing coupling agents are typically present in such binders, generally in the range from about 0.1 to about 1% by weight based on the weight of the solids in the binder composition. These additives are obviously selected such as not to antagonise the adhesive properties of the binder nor the mechanical and other desired properties of the final product comprising such binder composition or binder produced therefrom, and advantageously comply with stringent environmental and health related requirements.

Without being bound by theory, it is believed that curing generates highly crosslinked high molecular weight polymers which may be analysed by techniques generally known in the art, including determination of molecular weight, and other known techniques.

According to the present invention, the term "binder composition" is not particularly restricted and generally includes any composition which is capable of binding loosely assembled matter, either as such or upon curing and which comprises starting materials for formation of a thermoset resin binder upon curing and possibly reaction product resulting from the reaction of the relevant starting materials, as well as solvents (including water) and additives.

As used herein, the term "aqueous" is not particularly limited and generally relates to a solution and/or dispersion which is based on water as a solvent. Said term further includes compositions or mixtures which contain water and one or more additional solvents. An "aqueous binder composition" of the invention may be a solution or partial solution of one or more of said binder components or may be a dispersion, such as an emulsion or suspension.

The term "dry weight of the binder composition" means the weight of all components of the binder composition other than any water that is present (whether in the form of liquid water or in the form of water of crystallization)

The solid content of the invention aqueous binder composition may range from 5 to 95 w %, advantageously from 8 to 90 w %, preferably from 10 to 85 w %, based on the weight of the total aqueous binder composition. More specifically, when used as a binder for mineral wool insulation, the solid content of the aqueous binder composition may be in the range from 5 to 25 w %, preferably from 8 to 20 w %, more preferably from 10 to 20 w % or even 12 to 18 w %, based on the weight of the total aqueous binder composition. When used as a binder in wood boards, such as plywood, particle boards, fiber boards, the solid content of the aqueous binder composition may range from 50 to 95 w %, preferably 50 to 90 w %, more preferably 55 to 85 w % or even 60 to 80 w %, based upon the weight of the total aqueous binder composition.

Binder compositions of the invention may further comprise nano-particles derived from inorganic materials such as metal-oxides, preferably MgO, CaO, $Al_2O_3$ and $CaCO_4$. Furthermore, nanoclays may be incorporated in the binder formulations. Such nanoclays include, without being limited to, montmorillonite, bentonite, kaolinite, hectorite, and halloysite and other organically-modified nanoclays, and/or mixtures thereof. Such inorganic materials may be present in an amount ranging from 0.1 to 10 w %, preferably 0.1 to 5 w %, of solid content of the total composition.

The components of the invention binder compositions may be transported separately and combined shortly before use in the relevant manufacturing plant. It is also possible to transport the binder composition as such. In the alternative, pre-reacted copolymerized or cross-linked carbohydrate compound may be transported separately from the further cross-linker and possibly free radical initiator; the relevant components may then be combined shortly before use in accordance with the invention.

The binders of the invention may be used to bond a collection of non or loosely assembled matter. The collection of matter includes any collection of matter which comprises fibers selected from mineral fibers, including but not limited to slag wool fibers, stone wool fibers, glass fibers, aramid fibers, ceramic fibers, metal fibers, carbon fibers, polyimide fibers, polyester fibers, rayon fibers, and cellulosic fibers. Further examples of collection of matter include particulates such as coal, cellulosic fibers, wood shavings, saw dust, wood pulp, ground wood, wood chips, wood strands, wood layers, other natural fibers, such as jute, flax, hemp, straw, wood veneers, facings and other particles, woven or nonwoven materials. According to a specific embodiment of the invention, the collection of matter is selected from wood particles and mineral fibers.

In one illustrative embodiment, the binder composition of the invention may be used to make insulation products, comprising mineral fibers. In such an application, the fibers are bonded together such that they become organized in a fiberglass mat which may then be processed into an insulation product. In such an application, the fibers are generally present in an amount ranging from 70 to 99% by weight.

According to another embodiment of the invention, the binder may be used to bond cellulosic particles, such as cellulosic fibers, wood shavings, wood layers or sheets, wood pulp and other materials commonly used to manufacture composite wood boards, including fiber boards, particle boards, oriented strand boards, plywood etc. Such wood boards show nominal thicknesses ranging from 6 to 30 mm and a modulus of Elasticity of at least about 1000 N/mm$^2$, bending strength of at least about 5 N/mm$^2$ and/or an internal bond strength of at least 0.10 N/mm$^2$. In such applications, the binder content in the final wood board may range from about 5 to 30% wt with respect to the total weight of the wood board notably from 9 to 20%.

According to the invention, the aqueous binder composition may be applied in a manner known per se onto the fiber or particulate or sheet material. The binder composition may preferably be applied by spray application. Other techniques include roll application or mixing and/or tumbling the collection of matter with the binder composition. As water evaporates the binder composition forms a gel that bonds the particulate material together when arranged into a desirable assembly as detailed further herein below. When curing, the reactive binder components are caused to react to form essentially water insoluble macromolecular binder resin. Curing thus imparts increased adhesion, durability and water resistance as compared to uncured binder. Curing may be effected at temperatures between ambient (from about 10 to 25° C.) and up to 280° C.

According to another aspect, the invention covers a process for the preparation of a bonded assembly of fibrous materials or particulate or sheet materials by application of aqueous binder composition as per the invention, curing and water evaporation. The obtained product may then be further processed in suitable process steps to make intermediate or final products, including but not limited to insulation products or wood boards. More specifically, a process for the manufacturing of an assembly of fibers or cellulosic particles or sheets may comprise (i) the provision of (a) a carbohydrate compound, of appropriate amount of (b) first cross linker and of the desired amounts of (c) cross linker capable of undergoing radical polymerization and possibly of the desired amounts of (d) free radical initiator, and/or of reaction product of (a) and (b) and/or (c), (ii) the successive or simultaneous application of (a), (b), and (c) and possibly (d), possibly as an aqueous composition comprising reaction product of (a) and (b) and/or (c), onto fibrous or cellulosic particulate or sheet material to produce resinated material, and (iii) subjecting the resulting resinated material to conditions for radical polymerization of (a) and (c) and to curing conditions thereby allowing for evaporation of excess water.

The copolymerisation or crosslinking reaction by ester formation between the carbohydrate compound and the carboxyl functional compound may advantageously be performed at a temperature ranging from ambient temperature (e.g. 20° C.) to 100° C., preferably from 40-95° C.

The cross-linking of carbohydrate compound by radical polymerisation with a second cross linker capable of undergoing radical polymerisation may be effected at a temperature ranging from ambient temperature (e.g. 20° C.) to 100° C., preferably from 40-95° C., during a required period of time to generate the desired cross-linked material.

Curing may be effected at a temperature ranging from 90-200° C., preferably higher than 140° C., more preferably lower than 190° C., typically between 160 and 180° C. In the manufacture of wood boards, curing is performed while the material is subjected to pressing.

The invention binder composition and resulting binder may advantageously be used to bond fibrous material. The fibers may be assembled in a woven or non-woven product. The fibers may be natural fibers, such cotton or cellulose and other plant originated fibers. In the alternative, the fibers may be synthetic fibers, such as polyester fibers, polyamide fibers, polyethylene fibers etc. In another alternative, such fibers may be mineral fibers, such as carbon fibers, glass fibers, mineral wool fibers, for instance stone wool or glass wool fibers. Bonded fibers, such as polyester fibers and glass fibers or carbon fibers, may be used in different applications, mostly as reinforcement material. Mineral wool fibers usually serve to manufacture insulation products. It has been found that the invention binder satisfies the mechanical requirements and other requirements for the manufacture of products as mentioned. More specifically with regard to insulation products, the bonding and elasticity or resiliency requirements are found to be satisfied.

In the alternative, the invention binder composition and resulting binder may be used to bond cellulosic particulate or sheet like material, for instance in the manufacture of wood boards, including but not limited to particle boards, fiber boards of different density grades, OSB-type wood boards, and plywood The binder resin obtained from the binder composition disclosed herein comprises carbohydrate compound crosslinked by radical polymerization. The carbohydrate compound may be a carbohydrate copolymerized by ester formation.

Figure 1:
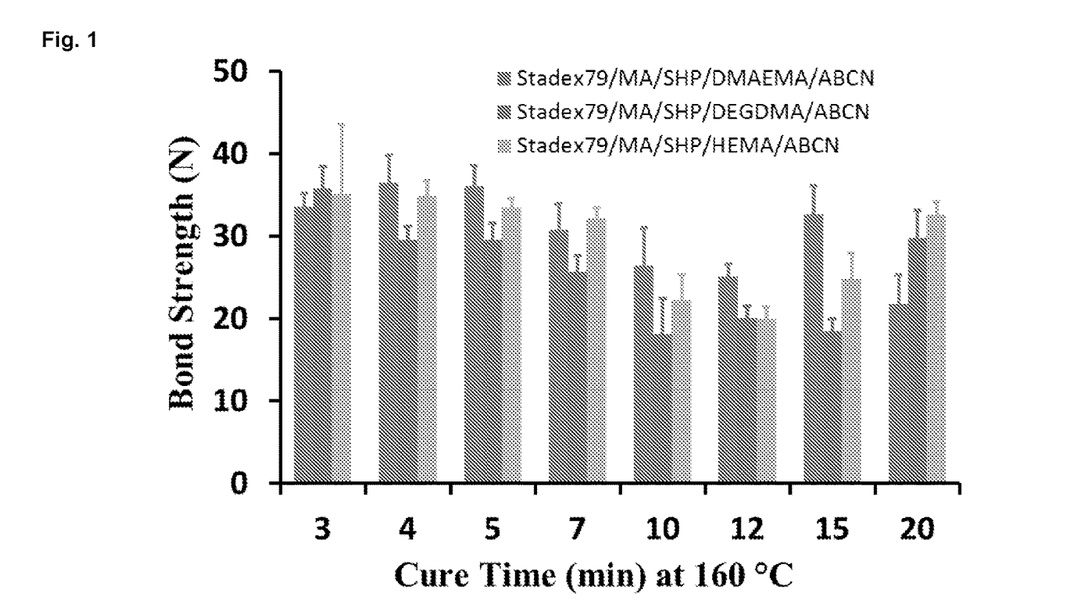
FIG. 1 shows the kinetic evaluation of curing determined at 160° C. for binder formulations of 65% T&L Stadex79+20% malic acid+5% SHP+10% second cross linker (DMAEMA, DEGDMA or HEMA)+1% 1,1'-azobis(cyclohexanecarbonitrile) radical initiator by determination of bond strength at different cure times.
Figure 2:
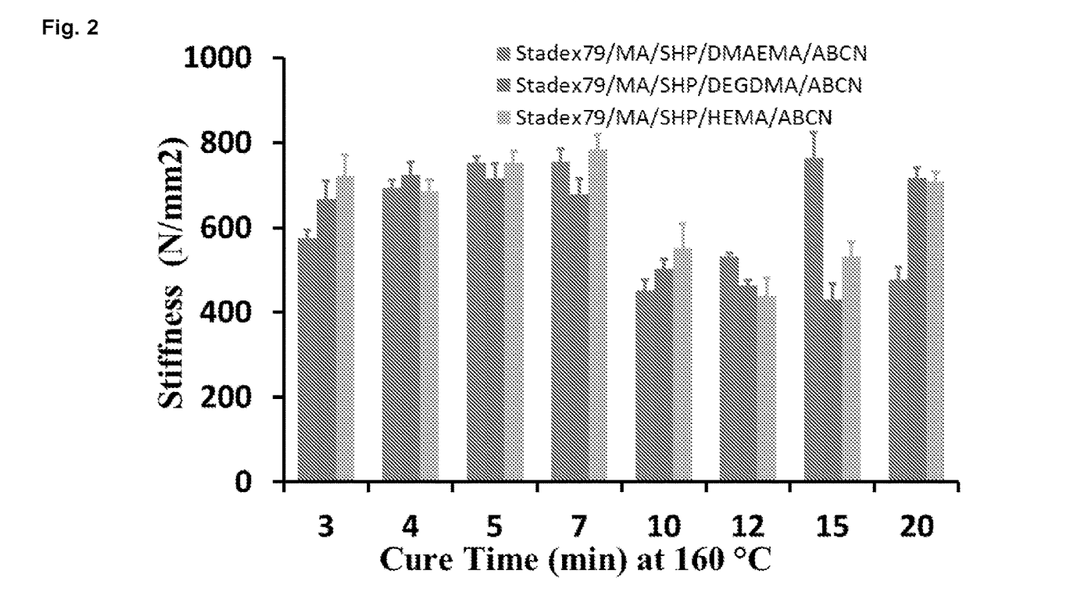
FIG. 2 shows the kinetic evaluation of curing determined at 160° C. for binder formulations of 65% T&L Stadex79+20% malic acid+5% SHP+10% second cross linker (DMAEMA, DEGDMA or HEMA)+1% 1,1'-azobis(cyclohexanecarbonitrile) radical initiator by determination of stiffness at different cure times.

The invention will be explained in more details in the examples below with reference to the attached Figures, in which:

FIGS. 1 and 2 show the kinetic evaluation of curing determined at 160° C. for binder formulations of 65% T&L Stadex79+20% malic acid+5% SHP+10% second cross linker (DMAEMA, DEGDMA or HEMA)+1% 1,1'-azobis (cyclohexanecarbonitrile) radical initiator, by determination of bond strength and stiffness at different cure times.

Materials for Binder Formulation

Different grades of starch polymers such as Stadex® 79, Stadex® 125, Stadex®201 Waxy, Ethylex® 2005S Gum, Ethylex® 2040 Gum and Ethylex® 2095 Gum were purchased from Tate & Lyle. Acrylate monomers such as poly(ethylene glycol) diacrylate, hexanediol diacrylate, ethylene glycol dimethacrylate, and di(ethylene glycol)dimethacrylate and other acrylate monomers such as hydroxyethyl methacrylate (HEMA), dimethylaminoethyl methacrylate (DMAEMA), hydroxy ethyl acrylate (HEA) were purchased from Aldrich. Malic acid (MA), glutamic acid and radical initiators such as 4,4'-Azobis-4-cyanopentanoic acid (ABCPA), 1,1'-Azobis (cyclohexanecarbonitrile) (ABCN) and Benzyl Peroxide (BPO) were also purchased from Aldrich.

Preparation of Binder Compositions

First, a desired amount of starch was dissolved in water and stirred constantly for 45 minutes at room temperature. If required, temperature may be raised up to 80° C. in order to dissolve the starch in water. For crosslinking reaction, various concentrations (10-30%) of malic acid and glutamic acid were added individually to the starch solution, followed by the addition of the required amount of SHP (0.5-5%), depending on the formulation. The obtained solution was stirred continuously for 45 minutes in the temperature range of 70-90° C. in order to allow for crosslinking.

In a second step, diacrylate or acrylate or polyacrylate monomers were added together with radical initiator and the resulting mixture was stirred continuously at a pre-set temperature in order to form a complex polymer network. The Energy required for radical initialisation may be adduced by increase of temperature. Other means are available too, like IR, RF or UV radiation.

The crosslinking of starch can take place between various molecules such as amylose to amylose, amylose to amylopectine or amylopectin to amylopectin. when the ester linkage is formed, a further crosslinking may be carried out with polyacrylates or acrylate monomers, making use of radical initiator.

The obtained aqueous composition was applied to a glass veil which was then subjected to curing. Samples were prepared from the cured veil and subjected to different tests as described below.

Determination of Binder Weight Loss

Aqueous binder compositions (solutions) as prepared above were brought to a solid content of 22.5%. About 12 g of solution was placed into aluminium petri dish, which was kept in an oven at 140° C. for 2 hours. Theoretical and experimental solid was measured and solid loss calculated.

Kinetic Evaluation of Curing

Glass microfiber (Whatman™) GF/A filters were impregnated with binder solution as prepared above prior to curing at various time points at a set temperature. Samples were kept on the top shelf in the oven to avoid high moisture content inside the oven during curing. For each binder solution, samples were cured from 3 minutes to 20 minutes. After curing, each cured sample was cut into an appropriate size with a length (150 mm) and width (20 mm), and then mechanical testing was performed for stiffness (elastic modulus) and bond strength analysis. Results of the kinetic study or cure rate study are presented in FIGS. 1 and 2.

It appears that the binder compositions cure within a time period ranging from 3-5 minutes.

Bond Strength Analysis Using the Veil Method

Commercial PF (phenol formaldehyde) impregnated (A4 size) glass fiber veils were placed into a muffle furnace oven for 30 minutes at 600° C. in order to burnout the PF binder, and were then allowed to cool for 30 minutes. The obtained veil samples were weighted.

Approx. 400 g binder solution samples were poured into dip trays, and the obtained veil samples carefully fully immersed into the relevant binder solutions. The impregnated veils were cured at desired temperature for desired periods of time. Binder content was then measured and bond strength determined as follows.

The bond strength of the relevant cured binder impregnated veils was determined by means of a mechanical testing instrument (M350-10CT). For each test a cured binder impregnated A4 veil was cut into 8 equal strips. Each strip was tested separately using a 50 Kg load cell (DBBMTCL-50 kg) at an automated test speed of 10 mm/min controlled by winTest Analysis software. Glass veil tensile plates were attached to the testometric machine in order to ensure a 100 mm gap between plates. Samples were placed vertically in the grippers; and the force was tarred to zero. Various parameters such as maximum load at peak, stress at peak and modulus at peak were evaluated by the software, and data presented as an average of 8 samples with standard deviation. The average maximum load at peak or stress at peak defined as the bond strength.

Evaluation of Weathering Stability

An electronically controlled autoclave system (a steam pressure vessel) was used to sterilise the cured binder veils samples for subsequent strength testing. Cured binder impregnated veils were placed in an autoclave (J8341, Vessel: PV02626 with associated safety valve, door interlock and integrated pipework) system. Samples were treated at 90% humidity and at a temperature ranging from 40° C. to 110° C. (full cycle), at a pressure of up to 2.62 bar, for 3 hours. The samples were dried completely in order to ensure no moisture remains onto the veils. The autoclave treated samples were tested for bond strength by means of testometric machine (M350-10CT) described here above, and the results were compared with those of untreated samples.

Example 1

Determination of binder solid weight loss upon curing at 140° C. for 2 hours, as presented in Table 1. Aqueous binder compositions (solutions) as prepared above were brought to a solid content of 22.5%. About 12 g of solution was placed into aluminium petri dish, which was kept in an oven at 140° C. for 2 hours. Theoretical and experimental solid was measured and solid loss calculated. The binder compositions comprise starch as a polysaccharide, malic acid (MA) as a cross linker, SHP, acrylates (HEMA, DEGDMA, HEA or MAA) as cross linker capable of undergoing radical polymerization, and ABCN as a radical initiator.

TABLE 1

| Binder Materials | Composition | Solid Loss (%) |
|---|---|---|
| Stadex 79/MA/SHP/HEMA/ABCN | 70/15/5/10/1 | 1.76 |
| Stadex 79/MA/SHP/HEMA/ABCN | 60/25/5/10/1 | 3.16 |
| Stadex 79/MA/SHP/DEGDMA/ABCN | 60/25/5/10/1 | 4.46 |
| Stadex 79/MA/SHP/DEGDMA/ABCN | 70/15/5/10/1 | 2.69 |
| Stadex 79/MA/SHP/HEA/ABCN | 60/25/5/10/1 | 2.34 |
| Stadex 79/MA/SHP/MAA/ABCN | 60/25/5/10/1 | 7.61 |
| Stadex 79/CAMH/SHP/HEMA | 75/15/5/10 | 1.2 |
| Stadex 79/CAMH/SHP/HEMA/ABCN | 75/15/5/10/1 | 1.0 |
| Stadex 79/CAMH/SHP/HEMA | 70/20/5/10 | 0.8 |
| Stadex 79/CAMH/SHP/HEMA/ABCN | 70/20/5/10/1 | 0.7 |

Stadex 79: Starch
CAMH: Citric acid monohydrate
SHP: sodium hypophosphite
HEMA: 2-hydroxyethyl methacrylate
DEGDMA: di(ethylene glycol)dimethacrylate
HEA: hydroxyethyl acrylate
MAA: methacrylic acid
ABCN: 1,1' Azobis(cyclohexanecarbonitrile)

Example 2

The kinetic evaluation of curing determined at 160° C. for binder formulations of 65% T&L Stadex79+20% malic acid+5% SHP+10% cross linker (DMAEMA, DEGDMA or HEMA)+1% 1,1'-azobis(cyclohexanecarbonitrile) radical initiator, as presented in FIG. 1, with a standard deviation of five replicates. The binder solution composition was prepared and the bond strength of corresponding sample was measured according to the procedure described in the previous section.

Example 3

The kinetic evaluation of curing determined at 160° C. for binder formulations of 65% Stadex79+20% malic acid+5% SHP+10% crosslinker (DMAEMA, DEGDMA or HEMA)+ 1% 1,1'-azobis(cyclohexanecarbonitrile) radical initiator, as presented in FIG. 2, with a standard deviation of five replicates. The binder solution composition was prepared according to the description given in the previous section. The stiffness (i.e. the modulus of elasticity) of corresponding samples is measured and plotted as a function of cure time (FIG. 2).

Example 4

Bond strength analysis of three different binder formulations is presented. (i) Formulation one comprising starch (stadex 79), polyacid (citric acid monohydrate (CAMH)) as a first crosslinker and sodium hypophosphite (SHP); (ii) the second formulation comprises additionally a second cross linker 2-hydroxyethyl methacrylate (HEMA) in formulation (i) and the third formulation comprises ABCN as a radical initiator plus the second cross linker of the second formulation. Here, the bond strength is defined as the maximum load at which the veil impregnated cured samples breaks down. Results also show with corresponding binder material formulations and ratios of unweathered and weather treated veil samples. These impregnated veils were cured in two steps comprising curing at 90° C. for 5 minutes then at 180° C. for 10 minutes. The mechanical tests were performed at dry conditions for both unweathered and weather treated veil samples, and the results are presented with standard deviation of eight replicates, as shown in Table 2. Results show the bond strength of second and third formulations are significantly higher as compared to the first formulation for both unweathered and weather treated samples.

TABLE 2

| | Unweathered Veil Samples | | Weather treated Veil Samples | |
| --- | --- | --- | --- | --- |
| Formulations | Bond Strength (N) | STDEV (+/−) | Bond Strength (N) | STDEV (+/−) |
| Stadex 79/CAMH/SHP: 80/20/5 | 81.9 | 9.03 | 49.31 | 7.48 |
| Stadex 79/CAMH/SHP/HEMA: 70/20/5/10 | 94.85 | 8.83 | 46.87 | 3.73 |
| Stadex 79/CAMH/SHP/HEMA/ ABCN: 70/20/5/10/1 | 100.65 | 5.78 | 56.76 | 5.04 |

Example 5

Bond strength analysis of various binder formulations of monosaccharide (e.g. Dextrose monohydrate, DMH), disaccharide (Maltose monohydrate, Maltose MH) and polysaccharide (from 3 to 19 saccharide units), and their combination with starch (Stadex 79), CAMH, HEMA and ABCN with or without SHP is presented. The mechanical tests were performed on unweathered cured (180° C. for 15 minutes) veil samples at dry conditions, and the results are presented with standard deviation based on eight replicates, as shown in Table 3.

TABLE 3

| Formulations | Average Bond Strength (N) | STDEV (+/−) |
| --- | --- | --- |
| DMH/CAMH/HEMA/ABCN: 70/20/10/1 | 74.22 | 11.23 |
| DMH/CAMH/HEMA/SHP/ABCN: 70/20/10/5/1 | 74.75 | 10.19 |
| Maltose MH/CAMH/HEMA/ABCN: 70/20/10/1 | 58.16 | 5.22 |
| Maltose MH/CAMH/HEMA/SHP/ABCN: 70/20/10/5/1 | 60.37 | 8.62 |
| Maltodextrin/CAMH/HEMA/ABCN: 70/20/10/1 | 73.85 | 5.56 |
| Maltodextrin/CAMH/HEMA/SHP/ABCN: 70/20/10/5/1 | 85.33 | 8.13 |
| Stadex 79/DMH/CAMH/HEMA/ABCN: 50/20//20/10/1 | 63.50 | 9.42 |
| Stadex 79/DMH/CAMH/HEMA/SHP/ABCN: 50/20//20/10/5/1 | 85.20 | 4.08 |
| Stadex 79/Maltose MH/CAMH/HEMA/ABCN: 50/20//20/10/1 | 57.04 | 6.73 |
| Stadex 79/Maltose MH/CAMH/HEMA/SHP/ABCN: 50/20//20/10/5/1 | 86.76 | 9.37 |
| Stadex 79/Maltodextrin/CAMH/HEMA/ABCN: 50/20//20/10/1 | 55.98 | 6.37 |
| Stadex 79/Maltodextrin/CAMH/HEMA/SHP/ ABCN: 50/20//20/10/5/1 | 95.92 | 12.37 |

Example 6

Further bond strength analysis of various binder formulations of different polysaccharides/starches with CAMH, HEMA and ABCN with SHP is presented. The mechanical tests were performed on weathered cured (190° C. for 10 minutes) veil samples, under dry conditions, as per Example 4 (except that the curing temperature was 190° C. instead of 180° C. and that the curing time was 10 minutes instead of 15 minutes). The results are presented in Table 4 and Table 5 with standard deviation based on eight replicates.

TABLE 4

| | Unweathered Veil samples | | Weathered Veil samples | |
| --- | --- | --- | --- | --- |
| Formulations | Bond strength (N) | STDV (+/−) | Bond strength (N) | STDV (+/−) |
| Stadex 125/CAMH/SHP: 80/20/5 | 94.92 | 11.26 | 51.53 | 5.27 |
| Stadex 125/CAMH/SHP: 70/30/5 | 93.01 | 7.88 | 50.84 | 8.89 |
| Stadex 125/CAMH/SHP/HEMA/ ABCN: 70/20/5/10/1 | 92.19 | 9.43 | 53.93 | 6.93 |
| Stadex 201/CAMH/SHP: 80/20/5 | 87.38 | 9.05 | 56.19 | 2.84 |
| Stadex 201/CAMH/SHP: 70/30/5 | 92.06 | 9.00 | 49.71 | 6.31 |
| Stadex 201/CAMH/SHP/HEMA/ ABCN: 70/20/5/10/1 | 89.64 | 9.32 | 55.57 | 7.02 |

TABLE 5

| Formulations | Unweathered Veil samples | | Weathered Veil samples | |
|---|---|---|---|---|
| | Bond strength (N) | STDV (+/−) | Bond strength (N) | STDV (+/−) |
| St Ethylex 2005S/CAMH/SHP: 80/20/5 | 98.16 | 8.47 | 73.49 | 4.35 |
| St thylex 2005S/CAMH/SHP: 70/30/5 | 96.79 | 9.56 | 64.2 | 8.77 |
| Ethylex/CAMH/SHP/HEMA/ ABCN: 70/20/5/10/1 | 87.25 | 6.25 | 57.65 | 10.08 |
| St Ethylex 2040/CAMH/SHP: 80/20/5 | 116.51 | 5.33 | 86.33 | 7.64 |
| St thylex 2040/CAMH/SHP: 70/30/5 | 116.01 | 4.49 | 70.29 | 6.38 |
| Ethylex/CAMH/SHP/HEMA/ ABCN: 70/20/5/10/1 | 100.05 | 9.58 | 73.23 | 6.90 |
| St Ethylex 2095/CAMH/SHP: 80/20/5 | 113.46 | 17.07 | 91.07 | 6.40 |
| St thylex 2095/CAMH/SHP: 70/30/5 | 103.98 | 9.96 | 85.40 | 6.30 |
| Ethylex/CAMH/SHP/HEMA/ ABCN: 70/20/5/10/1 | 111.95 | 6.24 | 66.06 | 6.50 |

The above examples make use of commercially available starches as mentioned above. As shown below by way of viscosity measurements, Stadex starches are low molecular weight starches, Ethylex 2040 and 2095 starch are higher molecular weight starches.

TABLE 6

Viscosity measurement of modified starches. Viscosity was measured using DV-II + Pro Viscometer Brookfield LV. All measurements were done at a constant temperature.

| Sample Name | Concentration (wt. %) | Temp. (° C.) | Viscosity Value (cps) | Comments |
|---|---|---|---|---|
| Stadex 79 | 20 | 35 | 6.67 | |
| Stadex 125 | 20 | 35 | 8.40 | |
| Stadex 201 | 20 | 35 | 4.17 | |
| Starch Ethylex 2005S | 15 | 35 | 67 | |
| Starch Ethylex 2005S | 20 | 35 | 275 | |
| Starch Ethylex 2040 | 20 | 35 | xxx | The viscosity above the highest detection limit of the machine. |
| Starch Ethylex 2040 | 15 | 35 | 9900 | Highly viscous. |
| Starch Ethylex 2095 | 20 | 35 | xxx | The viscosity above the highest detection limit of the machine. |
| Starch Ethylex 2095 | 15 | 35 | xxx | The viscosity above the highest detection limit of the machine. |
| Starch Ethylex 2095 | 10 | 70 | >101,000 | Highly viscous (below 70° C. machine did not detect). |

The invention claimed is:

1. An aqueous curable binder composition comprising a carbohydrate compound, a first cross-linker selected from a carboxyl function bearing compound which forms esters with the carbohydrate compound, a second cross-linker, the second cross-linker being different from the first and being capable of undergoing radical polymerization, and optionally a free radical initiator; wherein the carboxyl function bearing compound is selected from a monomeric polycarboxylic acid, and wherein the second cross-linker capable of undergoing radical polymerization is selected from an acrylamide monomer and a methacrylamides monomer, an acrylate monomer and a methacrylate monomer, an acrylic acid and its salts, acrylonitrile, a carbohydrate monomer, maleimide, and mixtures thereof.

2. The aqueous curable binder composition of claim 1 characterized by one or more of the following features:
   wherein the aqueous binder composition further comprises a reaction product resulting from crosslinking between the carbohydrate compound and the first cross-linker;
   wherein the carbohydrate compound is selected from a monosaccharide and/or a polysaccharide;
   wherein the carbohydrate compound is selected from a monosaccharide and/or a polysaccharide and wherein the polysaccharide comprises at least two saccharide units and up to $10^6$ saccharide units;
   wherein the carbohydrate compound is selected from a monosaccharide and/or a polysaccharide and wherein the polysaccharide is selected from native starch, carboxymethyl starch, hydroxyalkyl starch, cationic starch, amphoteric starch, a starch acetate, a starch phosphate, starch octenyl succinate, a starch copolymer, partially hydrolysed starch, acid modified starch, oxide modified starch, dextrin, and chitin.

3. The aqueous curable binder composition of claim 1, wherein the carboxyl function bearing compound is a monomeric polycarboxylic acid selected from a dicarboxylic acid and a tricarboxylic acid, an unsaturated aliphatic polycarboxylic acid, a saturated aliphatic polycarboxylic acid, an aromatic polycarboxylic acid, an unsaturated cyclic polycarboxylic acid and a saturated cyclic polycarboxylic acid, optionally substituted with hydroxy, halo, amino, alkyl, carboxy, alkoxy, anhydrides, salt, esters and mixtures thereof.

4. The aqueous curable binder composition of claim 1, wherein the composition further comprises one or more free radical initiator for initiation of cross-linking reactions between saccharide residues in the carbohydrate compound and the second cross-linker.

5. The aqueous curable binder composition of claim 1, wherein the second cross-linker is selected from an acrylamide monomer and a methacrylamide monomer which comprises alkylacrylamide, N-tert-Butylacrylamide, Diacetone acrylamide, N,N-Diethylacrylamide, N,N-Diethylmethacrylamide, N,N-Dimethylacrylamide, N-[3-(Dimethylamino)propyl]methacrylamide, N-Diphenylmethylacrylamide, N-Ethylacrylamide, N,N'-Hexamethylenebis(methacrylamide), N-Hydroxyethyl acrylamide, N-(Hydroxymethyl)acrylamide, N-(2-Hydroxypropyl)-2-methyl-prop-2-enamide, N-(Isobutoxymethyl)-acrylamide, N-Isopropylacrylamide, N-Isopropylmethacrylamide, Methacrylamide, N-(3-Methoxypropyl)acrylamide, N-Phenylacrylamide, 2-Acrylamido-2-methyl-1-propanesulfonic acid and its salts, 3-(Acrylamido)phenylboronic acid, N-Acryloylamidoethoxyethanol, N-(Triphenylmethyl)-methacrylamide or N-[Tris(hydroxymethyl)methyl]-acrylamide.

6. The aqueous curable binder composition of claim 1, wherein the second cross-linker is selected from an acrylate monomer which comprises 4-Acetoxyphenethyl acrylate, 4-Acryloylmorpholine, Butyl acrylate, 2-(4-Benzoyl-3-hydroxyphenoxy)ethyl acrylate, Benzyl 2-propylacrylate, tert-Butyl acrylate, 2-[[(Butylamino)carbonyl]oxy]ethyl acrylate, 4-tert-Butylcyclohexyl acrylate, 2-Carboxyethyl acrylate, 2-(Diethylamino)ethyl acrylate, Di(ethylene glycol) ethyl ether acrylate, Di(ethylene glycol) 2-ethylhexyl ether acrylate, 2-(Dimethylamino)ethyl acrylate, 3-(Dimethylamino)propyl acrylate, Dipentaerythritol penta-/hexaacrylate, Ethyl acrylate, Ethyl cis-((3-cyano)acrylate, Ethylene glycol dicyclopentenyl ether acrylate, ethylene glycol methyl ether acrylate, Ethylene glycol phenyl ether acrylate, Ethyl 2-ethylacrylate, 2-Ethylhexyl acrylate, Ethyl 2-propylacrylate, Ethyl 2-(trimethylsilylmethyl)acrylate, Hexyl acrylate, 4-Hydroxybutyl acrylate, 2-Hydroxyethyl acrylate, 2-Hydroxy-3-phenoxypropyl acrylate, Hydroxypropyl acrylate, Isobutyl acrylate, Isodecyl acrylate, Isooctyl acrylate, Lauryl acrylate, Methyl 2-acetamidoacrylate, Methyl acrylate, Methyl 3-hydroxy-2-methylenebutyrate, Octadecyl acrylate, Poly(ethylene glycol) acrylate, Poly(ethylene glycol) diacrylate, Poly(ethylene glycol) methyl ether acrylate, Poly(propylene glycol) acrylate, 3-Sulfopropyl acrylate and salts, Tetrahydrofurfuryl acrylate, 2-Tetrahydropyranyl acrylate, 3-(Trimethoxysilyl)propyl acrylate, 3,5,5-Trimethylhexyl acrylate, 10-Undecenyl acrylate, or Urethane acrylate methacrylate.

7. The aqueous curable binder composition of claim 1, wherein the second cross-linker is selected from a methacrylate monomer which comprises Allyl methacrylate, Aminoethyl methacrylate, 2-[3-(2H-Benzotriazol-2-yl)-4-hydroxyphenyl] ethyl methacrylate, Benzyl methacrylate, Bis(2-methacryloyl)oxyethyl di sulphide, Bis(2-methacryloyl)oxyethyl di sulphide, 2-(2-Bromoisobutyryloxy)ethyl methacrylate, 2-(tert-Butylamino)ethyl methacrylate, Butyl methacrylate, tert-Butyl methacrylate, Carbazole-9-ethylmethacrylate, 3-Chloro-2-hydroxypropyl methacrylate, Cyclohexyl methacrylate, 2-(Diethylamino)ethyl methacrylate, Diethylene glycol butyl ether methacrylate, Di(ethylene glycol) methyl ether methacrylate, 2-(Diisopropylamino) ethyl methacrylate, 2-(Dim ethyl amino)ethyl methacrylate, 2-Ethoxyethyl methacrylate, Ethylene glycol dicyclopentenyl ether methacrylate, Ethylene glycol methacrylate phosphate, Ethylene glycol methyl ether methacrylate, Ethylene glycol phenyl ether methacrylate, Ethylhexyl methacrylate, Ethyl methacrylate, Furfuryl methacrylate, Glycidyl methacrylate, Glycosyloxyethyl methacrylate, Hexyl methacrylate, Hydroxybutyl methacrylate, Hydroxyethyl methacrylate, Hydroxypropyl methacrylate, hydroxypropyl methacrylates, 2-Hydroxypropyl 2-(methacryloyl oxy)ethyl phthalate, 2-Hydroxy-3-{3-[2,4,6,8-tetramethyl-4,6,8-tris (propyl glycidyl ether)-2-cyclotetrasiloxanyl] propoxy}propyl meth acrylate, Isobutyl methacrylate, 2-Isocyanatoethyl methacrylate, Isodecyl methacrylate, Lauryl methacrylate, Methacrylic acid N-hydroxysuccinimide ester, Methyl methacrylate, 2-(Methylthio)ethyl methacrylate, mono-2-(Methacryloyloxy)ethyl maleate, mono-2-(Methacryloyloxy)ethyl succinate, 2-N-Morpholinoethyl methacrylate, Naphthyl methacrylate, 2-(2-Oxo-1-imidazolidinyl)ethyl methacrylate, Pentabromophenyl methacrylate, 1,4-Phenyl ene dimethacrylate, Phenyl methacrylate, Phosphoric acid 2-hydroxyethyl methacrylate ester, Poly(ethylene glycol) behenyl ether methacrylate, Poly(propylene glycol) methacrylate, Propyl methacrylate, 1-Pyrenemethyl methacrylate, Stearyl methacrylate, 3-Sulfopropyl methacrylate and salts, 3-(Trimethoxysilyl)propyl methacrylate, 3,3,5-Trimethylcyclohexyl methacrylate, (Trimethylsilyl) methacrylate, Urethane acrylate methacrylate, Urethane epoxy methacrylate, or Vinyl methacrylate.

8. The aqueous curable binder composition of claim 1, wherein the second cross-linker is selected from an acrylic which comprises 3-(Acryloyloxy)-2-hydroxypropyl methacrylate, Bis[2-(methacryloyloxy)ethyl] phosphate, Bisphenol A propoxylate diacrylate, 1,3- or 4-Butanediol diacrylate, 1,3 or 4-Butanediol dimethacrylate, N,N'-(1,2-Dihydroxyethylene)bisacrylamide, Di(ethylene glycol) dimethacrylate, Di(trimethylolpropane) tetraacrylate, Diurethane dimethacrylate, N,N'-Ethylenebis(acrylamide), Ethylene glycol dimethacrylate, Glycerol 1,3-diglycerolate diacrylate, Glycerol dimethacrylate, Glycerol propoxylate triacrylate, 1,6-Hexanediol diacrylate, 1,6-Hexanediol dimethacrylate, 1,6-Hexanediol ethoxylate diacrylate, 1,6-Hexanediylbis[oxy(2-hydroxy-3,1-propanediyl)] bisacrylate, Hydroxypivalyl hydroxypivalate bis[6-(acryloyloxy) hexanoate], Neopentyl glycol diacrylate, Neopentyl glycol propoxylate diacrylate, Pentaerythritol diacrylate monostearate, Pentaerythritol tetraacrylate, Pentaerythritol triacrylate, Poly(propylene glycol) diacrylate, Poly(propylene glycol) dimethacrylate, 1,3,5-Triacryloylhexahydro-1,3,5-triazine, Tricyclo-decanedimethanol diacrylate, Trimethylolpropane ethoxylate methyl ether diacrylate, Trimethylolpropane ethoxylate triacrylate, Trimethylolpropane ethoxylate triacrylate, Trimethylolpropane ethoxylate triacrylate, Trimethylolpropane propoxylate triacrylate, Trimethylolpropane triacrylate, Trimethylolpropane trimethacrylate, Tri(propylene glycol) diacrylate, or Tris[2-(acryloyloxy)ethyl] isocyanurate.

9. The aqueous curable binder composition of claim 1, wherein the free radical initiator is selected from hydrogen peroxide, mono- or di-alkali metal or ammonium salts of peroxodisulfuric acid, sodium or potassium persulfates or mixtures thereof, azobis (isobutyronitrile) (AIBN), 2,2'-Azobis(2-methylpropionitrile), 4,4'-azobis(4-cyanovaleric acid), 1,1'-azobis-(cyclohexanecarbonitrile), 2,2-azobis(2,4-dimethylvaleronitrile), 2,2'-azobis(amidinopropyl) dihydrochloride (AMA), potassium and/or sodium sulfite, potassium and/or sodium hydrogen sulfite, potassium and/or sodium metabisulfite, potassium and/or sodium hydrogen sulfide, iron sulfate, iron(II) ammonium sulfate, iron (II) phosphate, and ceric ammonium nitrate, and mixtures thereof.

10. The aqueous curable binder composition of claim 1, wherein the weight ratio on a dry basis of the second cross-linker capable of undergoing radical polymerization and the free radical initiator for initiation of cross-linking reactions between saccharide residues in the carbohydrate compound and the second cross-linker varies between 2/0.5 and 20/1.

11. The aqueous curable binder composition of claim 1, wherein the weight fraction on a dry basis of total cross-linker in the binder composition varies from 2-30 w %.

12. The aqueous curable binder composition of claim 1, wherein the free radical initiator represents from 0.05 to 5 wt. % of the total dry weight of the binder composition.

13. The aqueous curable binder composition of claim 3, wherein the dicarboxylic acid and the tricarboxylic acid are selected from malic acid, glutamic acid, glutaconic acid, 3-fumarylpyruvic acid, 2,5-furandicarboxylic acid, mesaconic acid, mesoxalic acid, glutaric acid, nedocromil, 4-(gamma-glutamylamino)butanoic acid, neoglutyl acid, succinic acid, and citric acid.

* * * * *